United States Patent Office 3,575,948
Patented Apr. 20, 1971

3,575,948
FORMING SMALL PARTICLES OF POLYPROPYL-
ENE BY DIRECT POLYMERIZATION
Harry W. Blunt, Claymont, Del., assignor to Hercules
Incorporated, Wilmington, Del.
No Drawing. Filed Mar. 29, 1968, Ser. No. 717,403
Int. Cl. C08f 1/56, 3/10
U.S. Cl. 260—93.7                           5 Claims

ABSTRACT OF THE DISCLOSURE

Polypropylene particles of less than 15µ are prepared by direct polymerization using a specially treated catalyst. The special catalyst treatment comprises preliminarily treating a trivalent titanium containing catalyst by polymerizing a small amount of ethylene, propylene, or butene-1 therewith at elevated temperature.

---

This invention relates to the preparation of small particles of polypropylene and, in particular, to the preparation of such small particles directly by polymerization, in the presence of specially treated catalysts.

It has long been the goal of workers in the polyolefins field to develop effective procedures for preparing olefin polymers, and particularly polypropylene, in the form of small particles. The conventional form in which polypropylene is recovered from the polymerization reaction is a flake of anywhere from about 30 to 300µ or more in size. Size reduction treatments have included mechanical treatments such as comminution in ball mills, hammer mills, and the like, physical treatments such as, e.g., spray drying of solutions and solvent stripping of emulsions, and attempts to form such particles directly by polymerization. In the latter category, some progress has been made in recent years. For example, it has been shown that polypropylene particles of about 3 to 10µ can be prepared by using a titanium trichloride catalyst which has been treated, in absence of activator, with an α-olefin of about 6 to 16 carbon atoms.

It is an object of this invention to provide a method of preparing polypropylene in the form of particles of up to about 15µ by polymerization directly to that size in the presence of a specially treated titanium trichloride containing catalyst. This objective is achieved by polymerizing propylene at low temperature in the presence of a titanium trichloride catalyst which has previously been treated by polymerizing therewith, at elevated temperature, an α-olefin having no more than about 4 carbon atoms.

Specifically, the invention is the process for polymerizing propylene in the form of fine particles of about 15µ and less which comprises heating a titanium trichloride-containing polymerization catalyst to above about 60° C. in the presence of an inert diluent and a catalyst activator, polymerizing therewith, at said temperature, at least 8 to 10 moles per mole of trivalent titanium of an α-olefin having no more than about 4 carbon atoms, cooling the resultant catalyst-diluent-activator mass to at least about 60° C., and thereafter polymerizing propylene in the presence of the thus-treated catalyst at a temperature no higher than about 60° C. Preferably, the propylene polymerization is performed at below about 50° C.

The catalyst and activator components specified for use in the invention comprise well known transition metal catalyst components. By titanium trichloride-containing catalyst is meant either true $TiCl_3$ containing only titanium and chlorine, or any of the well known complex compounds formed by reduction of $TiCl_4$ with various organometallic compounds, which are also frequently referred to as titanium trichloride for the sake of simplicity.

A particularly reactive complex titanium trichloride is prepared by reducing $TiCl_4$ at low temperature with an aluminum alkyl such as alkyl aluminum sesquichloride. Titanium tetrachloride can also be reduced with metallic aluminum to yield a useful titanium trichloride catalyst.

The titanium trichloride catalyst is employed in combination with an organometallic catalyst activator, preferably an alkyl aluminum compound, such as, e.g., dialkyl aluminum chloride or diisobutyl aluminum chloride in a ratio of about 0.1 to 4 moles of aluminum per mole of titanium.

The titanium trichloride catalyst and activator are suspended in an inert hydrocarbon diluent as a reaction medium. Any liquid hydrocarbon which is free of olefinic unsaturation can be used but preferably one will be selected which boils at higher than 120° C., such as octane, decane, or higher hydrocarbons or mixtures of such hydrocarbons such as gasoline or kerosene. If lower boiling hydrocarbons are used, such as pentane, or hexane, it may be necessary to provide means for preventing evaporation thereof at the treatment temperature.

The important and unique feature of the invention is the preliminary treatment step wherein the catalyst is used to polymerize a short chain α-olefin at elevated temperature. This treatment is believed to cause the catalyst particles to fracture into a multitude of much smaller particles. It is theorized that a polymer particle will be approximately 10 times the size of the catalyst particle by which it was produced. Thus, reduction of the catalyst particle size leads to reduction in the size of polymer particles prepared thereby. Advantage has been taken of this phenomenon in the prior work, referred to above, where titanium trichloride catalysts are treated with higher olefins to cause size reduction. However, the lower olefins have been polymerized in vast quantities in recent years and this catalyst fracturing phenomenon has not been observed to a significant degree under normal, preferred polymerization conditions.

The catalyst fracturing or splitting phenomenon takes place with lower olefins only when polymerization is effected at elevated temperatures. Specifically, the temperature should be at least about 60° C. and preferably between about 60° C. and 120° C. The temperature selected is dependent on the olefin which is used in this step. The upper range of usable olefins, butene-1, is operative at the 60° C. temperature level and above, while ethylene and propylene require at least 100° C. The reason why the elevated temperature is required is not clear, although it may be related to the solubility of the polymer in the hydrocarbon reaction diluent since the temperature requirement increases with decreasing ease of solution of polymer therein.

The pretreatment of the catalyst with short chain α-olefin requries only a small amount, i.e., about 8 to 10 mmoles of α-olefin per mmole of trivalent titanium. The amount of such α-olefin employed, however, is not important so long as enough is used to assure that the catalyst is completely fractured. If an excess is used, it simply polymerizes and remains in the reaction medium when the treated catalyst subsequently is employed in a further polymerization.

The polymer prepared during the catalyst pretreatment step is usually quite low in molecular weight due to the temperature at which it is formed. With any of the usable short chain α-olefins, the intrinsic viscosity of the polymer formed during this step is usually less than 1.

The size of the particles prepared in the final polymerization is related to the technique employed in the transition from catalyst treatment to conventional polymerization. For maximum particle size reduction, the catalyst treating monomer should be completely removed prior to cooling the reaction mixture from the treating temperature to 60° C. and below. When proceeding in this manner, the particles resulting from the polymerization are less than 5µ. If the treating monomer is present in the reaction mass during the cool down, the resultant particles cover a wider range of particle size, up to about 15µ. This overall range is substantially less than is produced by any conventional process where a special effort is not made to prevent large particles from forming.

The treating monomer can be removed by reacting out all of the same before allowing the temperature to drop or by venting it off. The monomer is then replaced by flushing the reactor with substantially oxygen-free nitrogen. Either technique is satisfactory although reacting it out is more practical.

The small polymer particles produced by the instant invention can be isolated by filtration, or, more preferably, by centrifugation from the reaction slurry and dried. However, in many cases, it is preferred to leave particles in the reaction medium. Due to their small particle size, they are readily dispersed in such liquid for use in fusion coatings and similar applications.

The propylene polymerization to form the desired small particles is effected by conventional methods known to the art. After the temperature has been reduced to below 60° C., propylene gas is pressured into the reactor at a slow rate so that the pressure is gradually increased to between about 50 and 75 p.s.i.g. The feed is continued at a rate to maintain this pressure during the course of the polymerization. The polymerization is usually carried out at a temperature between about 30 and 50° C. Reaction is continued in this manner until the desired solids content is reached or until the viscosity of the reaction mixture becomes too great for easy agitation. Polymerization is then arrested by adding a small amount, e.g., 2 volume percent, based on diluent volume of a low molecular weight alkanol such as n-butanol to deactivate the catalyst. Catalyst residues are then removed by means of an acid, water, or basic wash, treatment with an ion exchange resin or any other convenient means.

The process of the invention can be employed to prepare polymer of any desired intrinsic viscosity in the range of about 0.5 to 30 and even higher. Generally, the polymer will have intrinsic viscosity of about 1 to 12. The viscosity selected will be dependent on the use to be made of the particles. As in more conventional olefin polymerization processes, the molecular weight or intrinsic viscosity can be controlled by the addition of a small amount of hydrogen to the reaction.

The invention will now be illustrated by several examples. Parts and percentages are by weight unless otherwise specified.

EXAMPLE 1

A titanium trichloride catalyst was prepared by reducing TiCl$_4$ with ethyl aluminum sesquichloride. About 1 liter of a 1.5 molar solution of the alkyl in refined kerosene was charged to a reactor under nitrogen blanket and cooled to about 0° C. While the solution was vigorously agitated, there was added in a single charge, about 240 mmoles of TiCl$_4$. The mixture was stirred at 0° C. for about 4 hours, then heat treated for about 4 hours at 85° C., followed by heat treating for 24 hours at 100° C., then allowed to cool to room temperature. The slurry was transferred under N$_2$ to a centrifuge and the precipitate was separated and washed three times with heptane, then suspended in fresh heptane for use.

A nitrogen filled reactor of about 3 liters capacity was charged with about 2 liters of n-decane and about 10 mmoles of diethyl aluminum chloride. The reactor and contents were heated to about 120° C. and about 10 mmoles of the titanium trichloride-containing catalyst in heptane suspension was added. When the catalyst was thoroughly dispersed, propylene gas was admitted to the reactor, and 20 p.s.i.g. propylene pressure developed. Propylene was reacted for approximately 7 minutes till substantially no unreacted propylene remained. The reaction mass was then cooled from 120° C. to 50° C. by means of a cooling coil in the reactor, over a period of about 5 minutes. A reactor sample taken at this point contained a small quantity of polypropylene having an intrinsic viscosity of about 0.65.

The cooled reactor was then pressured to about 50 p.s.i.g. with propylene gas over about 60 minutes. This pressure was maintained as reaction continued over a period of about 2 hours at about 50° C. At this point, 20 ml. of n-butanol was added to arrest polymerization and agitation was continued an additional 16 hours at 50° C. The reaction mixture, containing about 12.3% solid polymer, was removed from the reactor, and the polypropylene was separated by centrifuging and washed three times with n-heptane.

The recovered polypropylene had an intrinsic viscosity of 6.8, and the particles were substantially all within the 1 to 3µ particle size range.

EXAMPLE 2

The nitrogen-filled 3 liter reactor was charged with 2 liters of n-decane and 10 mmoles of diethyl aluminum chloride and the temperature raised to 120° C. To this was added about 10 mmoles of the titanium trichloride catalyst of Example 1. The nitrogen blanket was purged and propylene charged to a pressure of about 25 p.s.i.g. Propylene was reacted for about 24 minutes ar until about 0.130 mole had reacted. With the temperature still at 120° C., residual propylene gas was vented off and the reactor was flushed by pressuring three times to 50 p.s.i.g. with nitrogen gas. When all propylene was removed, the reactor was cooled to about 50° C. over a period of about 4 minutes by introducing cold water to internal cooling coils.

The reactor was immediately pressured to 50 p.s.i.g. with nitrogen and vented to atmospheric pressure. Propylene was admitted over about 50 minutes to attain 50 p.s.i.g. pressure the reaction was continued over a period of about 6 hours at 50° C. Polymerization was stopped by adding 20 ml. of n-butanol and the mass was agitated for 16 hours at 50° C. The reaction mixture, containing about 11.7% solid polymer was centrifuged to remove the solid polymer, and the polymer was washed three times with n-heptane.

The polymer has particle size of 1 to 5µ and an intrinsic viscosity of 7.95.

EXAMPLE 3

The procedure of Example 1 was repeated substantially identically except that, instead of reacting out all of the propylene gas used for the catalyst treatment, the excess gas was permitted to remain in the reactor during the cool-down from 120° C. to 50° C. Results were substantially equivalent except that the particles were 5 to 13µ in size.

EXAMPLE 4

Example 1 was repeated using 10 p.s.i.g. of ethylene gas pressure at 120° C. for catalyst treatment. Treatment time was about 5 minutes, and the mass was cooled to 50° C. over about 6 minutes.

The polypropylene prepared by this example was in the form of particles of 1 to 5µ, having an intrinsic viscosity of 11.3.

EXAMPLE 5

Example 1 was repeated using 6 p.s.i.g. of ethylene gas at 100° C. in the catalyst treatment. Treatment time was 10 minutes, following which the mass was cooled to 50° C. over about 4 minutes.

When this catalyst was used in the polymerization of propylene, the product recovered had a particle size of 1 to 3µ and its intrinsic viscosity was 3.3.

EXAMPLE 6

Example 1 was again repeated using 5 p.s.i.g. of a 50/50 mixture of ethylene and propylene gas at 100° C. in the catalyst treatment. Treatment time was about 2 minutes and the mass was cooled to 50° C. over about 5 minutes.

When propylene was polymerized using this catalyst, the polymer recovered was in the form of particles of about 1 to 5$\mu$ and its intrinsic viscosity was about 2.6.

What I claim and desire to protect by Letters Patent is:

1. A process for homopolymerizing propylene in the form of fine particles of less than about 15 microns which comprises:
    (a) heating a titanium trichloride containing polymerization catalyst to about 100 to 120° C. in the presence of an inert diluent and a dialkylaluminum chloride catalyst activator;
    (b) polymerizing therewith at said temperature at least 8–10 moles of an olefin selected from the class consisting of ethylene and propylene per mole of trivalent titanium;
    (c) cooling the resultant catalyst-diluent-activator mass to at least about 60° C., and
    (d) thereafter polymerizing propylene in the presence of the treated catalyst at a temperature less than about 60° C.

2. The process of claim 1 where the titanium trichloride containing catalyst is the product obtained by the reduction of TiCl$_4$ with alkyl aluminum sesquichloride.

3. The process of claim 2 where unreacted olefin is removed from the process prior to cooling the reaction mass from the catalyst treatment temperature.

4. The process of claim 2 where unreacted olefin is present in the reaction mixture during the cool down from the catalyst treatment temperature.

5. A process for homopolymerizing propylene in the form of fine particles of less than about 15 microns which comprises:
    (a) heating a titanium trichloride-containing polymerization catalyst to about 60 to 120° C. in the presence of an inert diluent and a dialkylaluminium chloride catalyst activator;
    (b) polymerizing therewith at said temperature at least 8–10 moles of butene-1 per mole of trivalent titanium;
    (c) cooling the resultant catalyst-diluent-activator mass to at least about 60° C.; and
    (d) thereafter polymerizing propylene in the presence of the treated catalyst at a temperature less than about 60° C.

References Cited

UNITED STATES PATENTS

| | | | |
|---|---|---|---|
| 3,067,183 | 12/1962 | Hagemeyer et al. | 260—88.2 |
| 3,397,195 | 8/1968 | Lukach et al. | 260—93.7 |
| 3,401,212 | 9/1968 | Griffin et al. | 260—878 |
| 3,442,820 | 5/1969 | Dieckmann | 252—429 |
| 3,388,076 | 6/1968 | Lamborn | 252—429 |

FOREIGN PATENTS

| | | |
|---|---|---|
| 979,123 | 1/1965 | Great Britain. |

OTHER REFERENCES

Natta et al., Advances in Catalysis, Academic Press, Inc., New York, 1959, pp. 11–13

JOSEPH L. SCHOFER, Primary Examiner

E. J. SMITH, Assistant Examiner

U.S. Cl. X.R.

252—429; 260—878